(12) United States Patent
Siwy et al.

(10) Patent No.: US 9,873,090 B2
(45) Date of Patent: Jan. 23, 2018

(54) APPARATUS AND METHOD FOR NANOPOROUS INORGANIC MEMBRANES AND FILMS, METHODS OF MAKING AND USAGE THEREOF

(71) Applicant: The Regents of the University of California, Oakland, CA (US)

(72) Inventors: Zuzanna S. Siwy, Irvine, CA (US);
Ivan V. Vlassiouk, Oak Ridge, TN (US); Pavel Yu Apel, Moscow Region (RU); Sergey N. Dmitriev, Moscow Region (RU)

(73) Assignee: The Regents of the University of California, Oakland, CA (US)

( * ) Notice: Subject to any disclaimer, the term of this patent is extended or adjusted under 35 U.S.C. 154(b) by 444 days.

(21) Appl. No.: 13/968,833

(22) Filed: Aug. 16, 2013

(65) Prior Publication Data
US 2014/0021133 A1    Jan. 23, 2014

Related U.S. Application Data

(63) Continuation-in-part of application No. 12/814,298, filed on Jun. 11, 2010, now abandoned.

(60) Provisional application No. 61/187,998, filed on Jun. 17, 2009.

(51) Int. Cl.
| | |
|---|---|
| *B01D 67/00* | (2006.01) |
| *B01D 61/14* | (2006.01) |
| *B01D 61/18* | (2006.01) |
| *B01D 71/02* | (2006.01) |

(52) U.S. Cl.
CPC ......... *B01D 67/0062* (2013.01); *B01D 61/14* (2013.01); *B01D 61/18* (2013.01); *B01D 71/02* (2013.01)

(58) Field of Classification Search
None
See application file for complete search history.

(56) References Cited

U.S. PATENT DOCUMENTS

| | | | | |
|---|---|---|---|---|
| 5,587,586 | A * | 12/1996 | Kruit | H01J 3/021 250/423 F |
| 2002/0125192 | A1* | 9/2002 | Lopez | B01L 3/502746 210/656 |
| 2007/0125701 | A1* | 6/2007 | Ramaswamy | B01D 67/0062 210/490 |

(Continued)

OTHER PUBLICATIONS

Inorganic membranes for separation and reaction, Hsieh, Membrane science and technology series 3, Elsevier, 1996: pp. 79 and 80.*

(Continued)

*Primary Examiner* — Krishnan S Menon
(74) *Attorney, Agent, or Firm* — Marcus C. Dawes; Daniel L. Dawes

(57) ABSTRACT

A method for fabricating isolated pores in an inorganic membrane includes the steps of patterning the inorganic membrane to selectively expose a portion of the membrane, forming a plurality of tracks of material damage in the exposed portion of the inorganic membrane by irradiation with energetic ions, and chemically etching the track damaged material to define the pores through the inorganic membrane with a predetermined geometrically defined cross sectional shape and with a controlled diameter range from less than 1 nanometer and up to micrometer scale.

13 Claims, 10 Drawing Sheets

(56) References Cited

U.S. PATENT DOCUMENTS

2007/0173286 A1* 7/2007 Carter .................. H04B 1/0082
                                                                455/553.1
2009/0120874 A1* 5/2009 Jensen .................. B01D 69/02
                                                                210/638

OTHER PUBLICATIONS

Fischer et al "Production and use of nuclear tracke: imprinting structure on solids", Rev. Mod. Phys. 55, 907, Oct. 1, 1983.*
Quinn et al, Model pores of molecular dimension the preparation and characterization of track-etched membranes, Biophysics J., Aug. 12, 1972(8); 990-1007.*

* cited by examiner

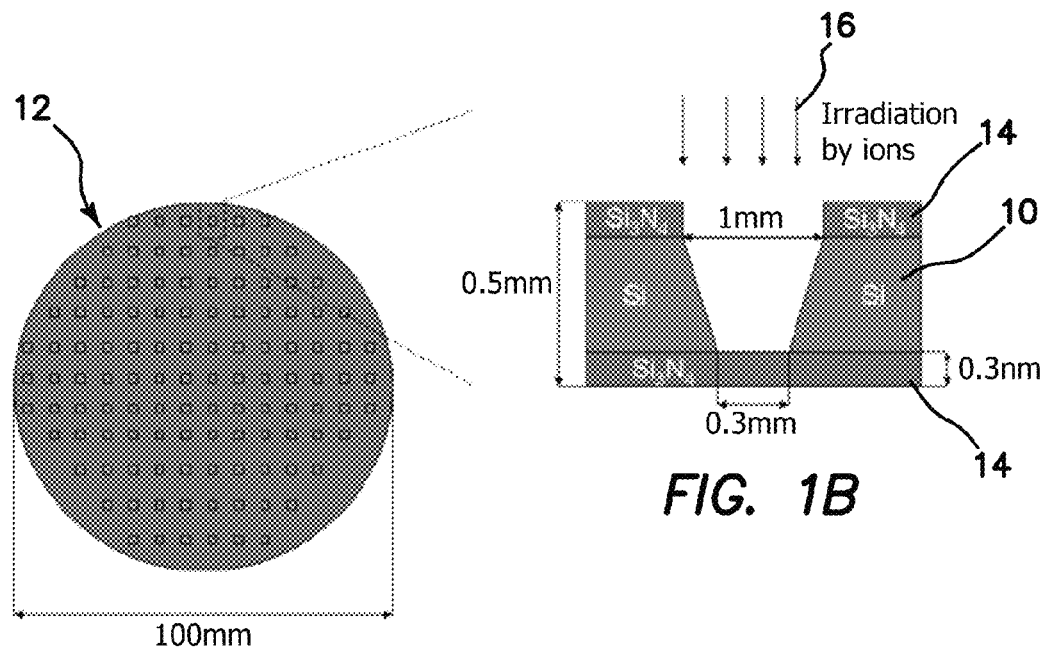
FIG. 1A
FIG. 1B
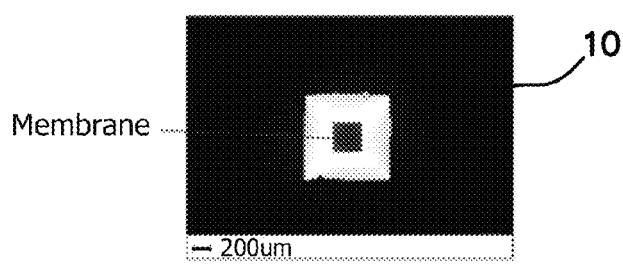
FIG. 1C

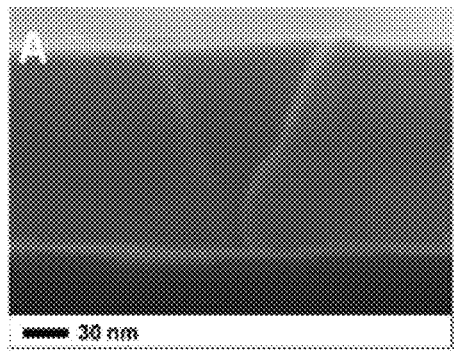 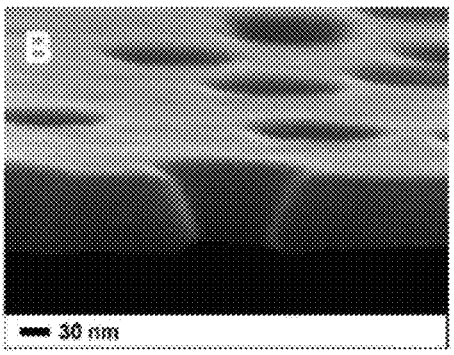
FIG. 5A        FIG. 5B
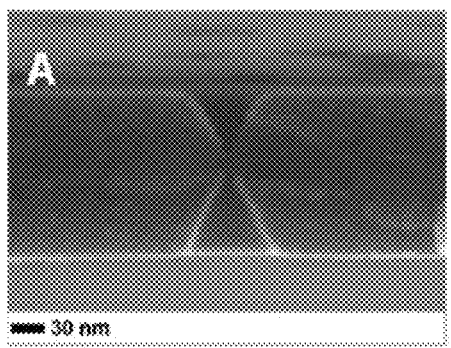 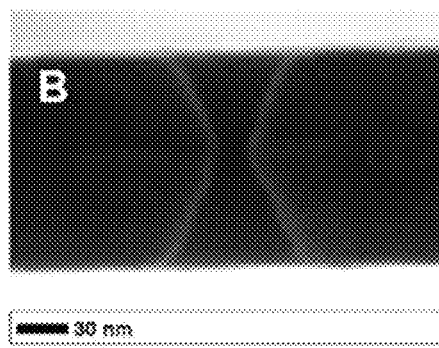
FIG. 6A        FIG. 6B

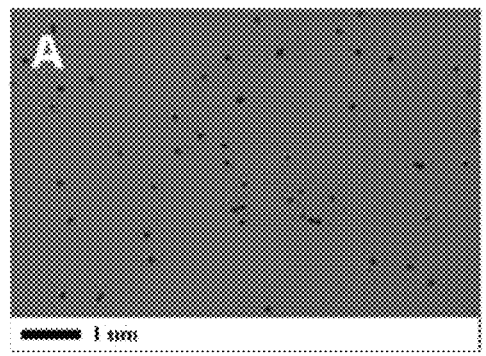 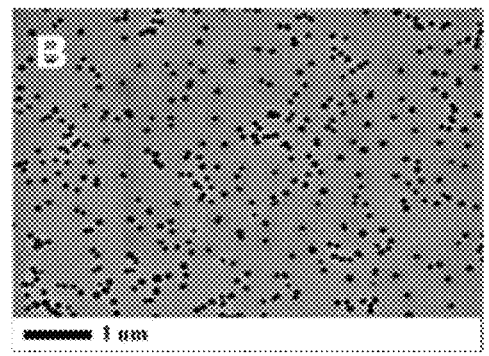
FIG. 7A        FIG. 7B
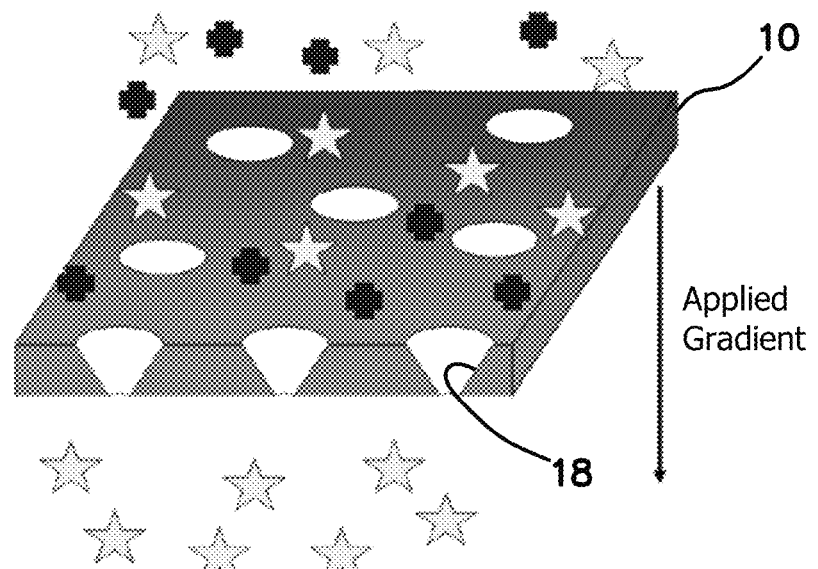
FIG. 8

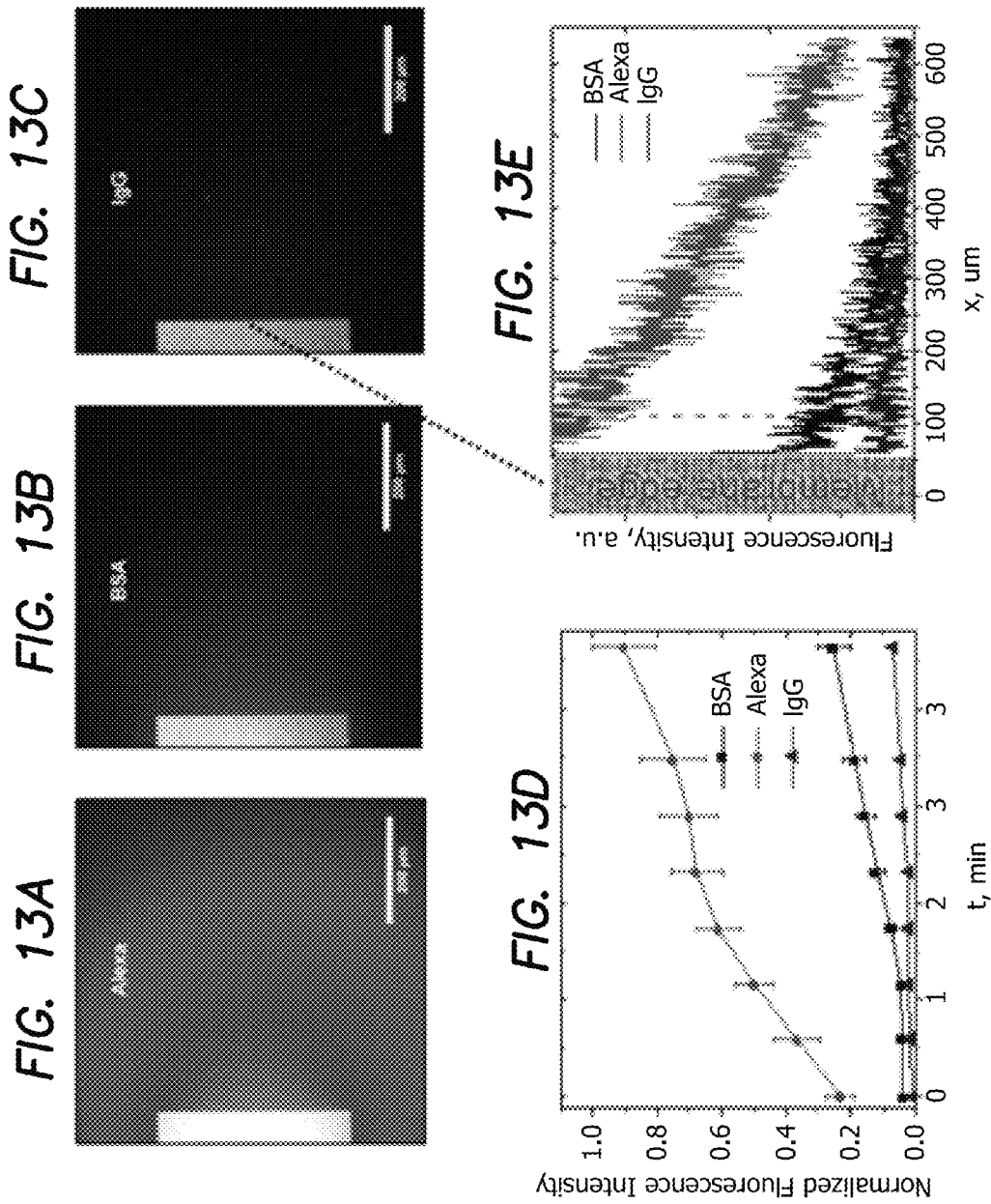

APPARATUS AND METHOD FOR NANOPOROUS INORGANIC MEMBRANES AND FILMS, METHODS OF MAKING AND USAGE THEREOF

RELATED APPLICATIONS

The present application is related to U.S. Provisional Patent Application Ser. No. 61/187,998, filed on Jun. 17, 2009, which is incorporated herein by reference and to which priority is claimed pursuant to 35 USC 119.

GOVERNMENT RIGHTS

This invention was made with Government support under Grant no. 0747237, awarded by the National Science Foundation. The Government has certain rights in this invention.

BACKGROUND OF THE INVENTION

Field of the Invention

The invention relates to the field of track etching methodologies for forming nanopores in inorganic membranes.

Description of the Prior Art

Membranes containing straight pores are often prepared by the track-etching technique. One of the most frequently used track-etch membranes are polymer films e.g. polycarbonate, polyimide, and polyesters. These films are typically several micrometers thick, which limits the flow rate when the membranes are used in filtration. The polymer material of the membranes is the reason why it is very difficult to integrate such membranes with other microfluidic or nanofluidic devices and lab-on-chip systems. The pore size of such polymer membranes cannot be controlled with sub-nanometer precision.

US Patent Publication 2006/0278580 A1 describes the making of thin silicon membranes but not other types of inorganic materials, the use of local instability of the material at high temperatures without the ability to control the porosity of the membrane (number of pores) which is crucial for many applications, especially filtration/separation, and without the ability to make pores with different shapes, e.g. conical and double-conical or to easily control of membrane thickness independently of porosity and pore size. Latent track etching techniques are well known in thin membranes, but such polymer membranes are not ultrathin and are characterized by limited flux rates.

BRIEF SUMMARY OF THE INVENTION

The illustrated embodiments of the invention are directed to the fabrication of reusable inorganic membranes (SiN membranes are presented as an example) containing nanopores (single nanopores or an array of them) of well defined geometry with pore diameters from less than 1 nanometer and up to micrometer scale. The pore length can also be controlled in a range from a few nanometers up to a microscale. The membranes can be applied in separation/filtration and biosensing processes; fuel cells membranes; mimicking the biological channels. They can also be used as a support and windows for transmission electron microscopy, and other imaging techniques. The membranes can also be used as masks for nanofabrication processes.

Thus, the illustrated embodiment includes a process involving fabrication of isolated nanopores in inorganic films with well-defined geometry, (shape, diameter, and length) and surface chemistry. The process includes the formation of tracks by irradiation with energetic heavy ions of sufficiently high atomic number, and subsequent chemical etching of the tracks. The illustrated embodiment shows the preparation of nanopores in thin silicon nitride films. These membranes can find multiple applications in: (i) microscopy techniques e.g. as supports, windows for transmission electron microscopy, (ii) molecular sieves, thus separation/filtration of molecules by size and surface charge or by other means, (iii) template for biosensors and masks for lithography, (iv) model systems for biological channels, (v) membranes for fuel cells.

The advantages of the illustrated embodiment include:

a. The thickness of the proposed silicon nitride membranes (and membranes in other inorganic films) can be tuned in a wide range between less than 10 nanometers and micrometer range. Ultrathin membranes enhance transport rates. Tunable thickness of the membranes thus defines the surface of interactions between passing analytes from the solution at the pore walls, which enables optimization for separation applications.

b. The material of our membranes can withstand very harsh conditions such as high temperatures which widens the window of applications for such nanoporous membranes.

c. Predicted achievable pore diameter is less than 1 nm and can be tuned up to hundreds of nanometers.

d. The material of the membrane is well known and established in semiconductor industry. Common lithographic techniques can be used for easy integration of the membranes to micro/nanofluidic complex devices.

e. The surface of the silicon nitride membrane and the pore walls can be easily functionalized with desirable biological/chemical molecules, e.g. DNA and proteins using well-known silane and other chemistries.

f. Membranes in silicon nitride and other inorganic membranes can be used as windows for high-resolution transmission electron microscopy imaging. Polymer membranes forbid this highly demanded application. Silicon membranes disclosed in the art contain small crystalline structures which can give a diffraction patterns, whereas our material is truly amorphous which is highly beneficial for transmission electron microscopy.

g. Our membranes can serve as "windows" or collimators for low energy ion beams.

Uses and applications of the illustrated embodiments are found in filtration/desalination membranes, molecular sieves, which offer high flow and selectivity based on variety of properties, e.g. charge and size, transmission electron microscopy windows, and generally in electron microscopy, separation, filtration, desalination and biosensing processes.

In summary, the illustrated embodiments of the invention include a method for fabricating isolated pores in an inorganic membrane comprising the steps of patterning the inorganic membrane to selectively expose a portion of the membrane, forming a plurality of tracks of material damage in the exposed portion of the inorganic membrane by irradiation with energetic ions, and chemically etching the track damaged material to define the pores through the inorganic membrane with a predetermined geometrically defined cross sectional shape, length, and with a controlled diameter range from less than 1 nanometer and up to micrometer scale.

The steps of patterning, forming and chemically etching are performed with inorganic membranes with a thickness as thin as less than 10 nm. There is however no limitation on the thickness which can be chosen from a few nm to a micrometer scale.

The steps of chemically etching the track damaged material to define the pores comprise defining pores with a tunable diameter between hundreds of nm down to less than 1 nm.

The steps of patterning, forming and chemically etching are performed with semiconductor or inorganic membranes.

The method further includes the step of functionalizing the membrane and the pore walls with selected biological or chemical molecules.

The steps of patterning, forming and chemically etching are performed with amorphous inorganic membranes.

In the illustrated embodiment the steps of patterning, forming and chemically etching are performed with silicon nitride film.

In one embodiment the steps of forming a plurality of tracks of material damage in the exposed portion of the inorganic membrane by irradiation with energetic ions of sufficiently high atomic number, and chemically etching the track damaged material to define the pores through the inorganic membrane are each performed from a different corresponding side of the membrane.

The step of forming a plurality of tracks of material damage in the exposed portion of the inorganic membrane by irradiation with energetic ions comprises forming a plurality of tracks of material damage in the exposed portion of the inorganic membrane by irradiation with heavy energetic ions having an atomic number of 8 or greater. In the illustrated embodiments the atomic number of 8 corresponds to the track etching threshold in inorganic insulators. However, in other embodiments it is to be understood that the atomic number of 18 (argon ions) or greater corresponds to well-etchable tracks and constitutes something "intermediate" because pores of good quality require irradiation with even heavier ions.

The step of chemically etching the track damaged material to define the pores through the inorganic membrane comprises chemically etching the track damaged material to define the pores with conical, biconical pores, or cylindrical geometries by selection of etching agents and etching conditions.

The illustrated embodiments further include a thin film or membrane made according to any one of the above embodiments of the methodology.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1A is a diagram of a plan view of a Si wafer in which a plurality of patterned membranes of the illustrated embodiments have been fabricated using track etching.

FIG. 1B is a diagram of a side cross-sectional view in enlarged scale of one of the patterned and supported membranes fabricated in the wafer of FIG. 1A depicted as it is being irradiated with ions.

FIG. 1C is a scanning electron microphotograph of a plan view of one of the prepared membranes of FIGS. 1A and 1B.

FIG. 2A illustrates that conical pores are formed when the access of the etching agent is hindered from one side of the membrane. FIG. 2B illustrates that cylindrical pores are formed when etching of the damaged material is much faster than the etching rate of the undamaged bulk material. FIG. 2C illustrates that biconical or hour-glass shaped pores are formed when the etching is performed from both sides of the membrane

FIGS. 5A and 5B are side cross-sectional scanning electron microphotographs of membranes with conical pores defined therein, which were obtained by etching irradiated SiN films for 40 minutes and 50 minutes respectively showing that the etching time controls the pore radius and partially controls the membrane thickness.

FIGS. 6A and 6B are side cross-sectional scanning electron microphotographs of membranes with biconical pores defined therein, which were obtained by $H_3PO_4$ etching irradiated SiN films for 30 minutes and 40 minutes respectively freely from both sides of the membrane, showing that the etching time controls the pore radius and partially controls the membrane thickness.

FIGS. 7A and 7B are plan view scanning electron microphotographs of membranes showing that irradiation density controls the final membrane porosity with pores defined therein obtained by etching films irradiated for 30 minutes by $10^8$ ions per $cm^2$ and for 50 minutes by $10^9$ ions per $cm^2$ respectively.

FIG. 8 is a perspective diagram illustrating filtration by a membrane of the illustrated embodiments in which two species of analyte denoted by a plus sign and a star differ by either charge or size, or the pores have some other way of distinguishing between the two species. When an initial solution containing a mixture of both species is disposed on one side of the membrane, the application of any driving force, e.g. pressure, electric field, concentration gradient etc., causes separation of the two species so that the collection solution shown in the diagram at the bottom contains primarily only one species, shown here as represented by the stars.

FIGS. 13A-13E illustrate the simultaneous separation of BSA and IgG proteins.

Figures 2A, 2B, 2C:
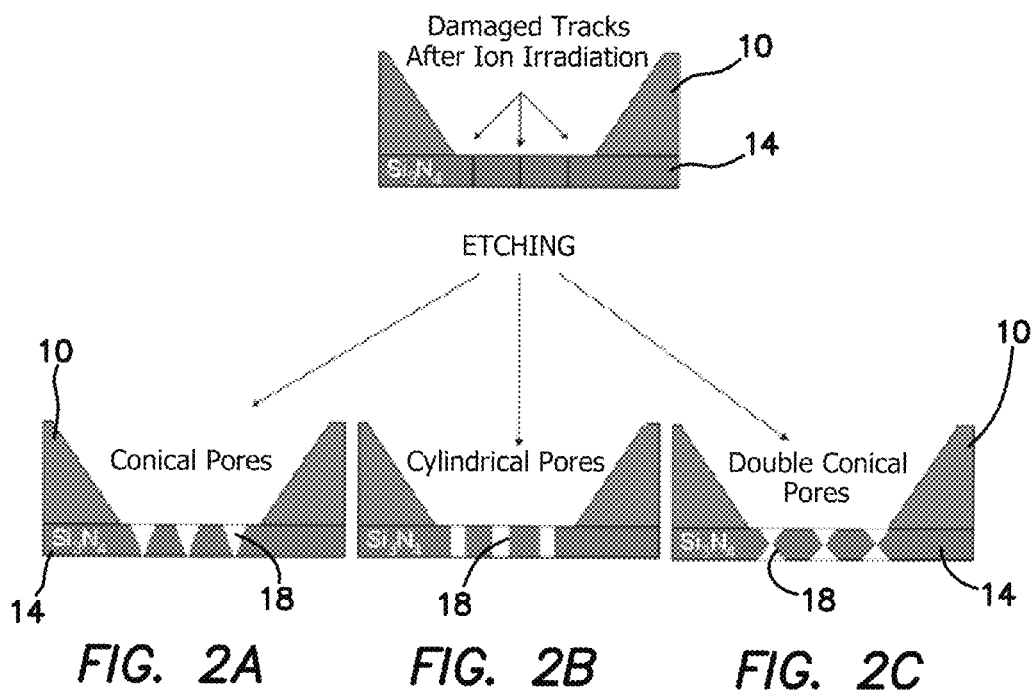
FIGS. 2A-2C diagrammatically depict a plurality of different pore fabrications in the membrane of FIG. 1B.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment discloses a fabrication method using silicon nitride films as an example. The same approach can be used for preparation of straight, well-defined pores in other inorganic films, e.g. silica, alumina and similar materials. The production process starts with the product which is well described in the literature and can be bought or easily made. We used homemade starting materials. All the dimensions in the following figures are not to scale and just serve as an example.

As shown in FIGS. 1A-1C using standard lithography techniques, supported patterned membranes 10 are made on a silicon wafer 12 covered or supported on its upper and lower surfaces with desired dielectric layer 14 ($Si_xN_y$, for example). The supported patterned membranes 10 are then irradiated with energetic ions 16 diagrammatically illustrated in FIG. 1B. The irradiation can be done from different sides of the membrane 10. FIG. 1B shows an example in which the irradiation is performed from the patterned side of the wafer 12. FIG. 1C is a scanning electron microscope image of the prepared patterned membrane 10.

Figures 3A, 3B:
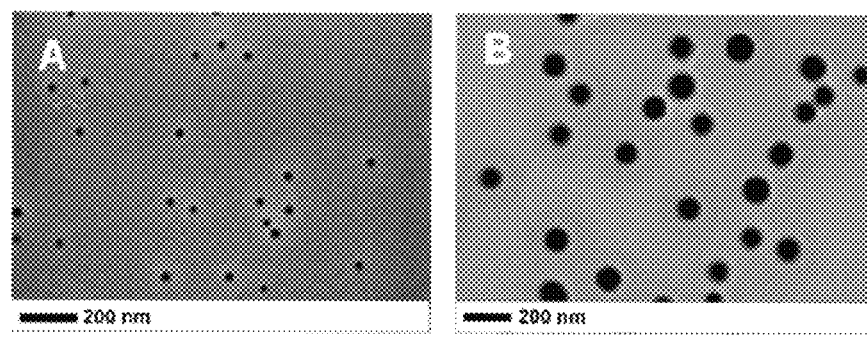
FIGS. 3A and 3B are scanning electron microphotographs of a plan view of membranes with conical pores defined therein, which were obtained by etching irradiated SiN films in $H_3PO_4$ for 20 minutes and 50 minutes respectively. The larger openings of the conical pores are visible in the microphotographs, but the smaller openings are too small to be resolved by scanning electron microphotography.

After the irradiation with energetic ions 16, the damaged tracks can be etched using various well known agents. Formation of pores using $H_3PO_4$ and HF as the etching agents are demonstrated here only as examples. Conical pores 18 as shown in FIG. 2a, and double conical pores 18 in FIG. 2c were prepared using conventional latent track etching steps. Cylindrical geometry of the pores 18 in FIG. 2b can be obtained by using proper conventional latent track etching agents and etching conditions. The pore radius is controlled by the etching time. The pore length is determined by the thickness of the original deposited film as well as the conditions of chemical etching used to develop the latent tracks. For example FIGS. 3A and 3B shows conically shaped nanopores 18 prepared according to FIG. 2a obtained by etching 300 nm thick SiN film in 150° C. $H_3PO_4$. The SiN film had been prior irradiated with energetic Bi ions. Equation (1) gives the base radii of the pores in terms of the latent track etching parameters, $$A = t \cdot (v-g) \cdot \tan[\sin^{-1}(g/v)] \qquad (1)$$

where A is the base radii, g is the bulk etching rate, v is the track etching rate, t is the etching time. g/v can be determined from the pore angle (see FIG. 5A) and it equals to 0.39 for membranes irradiated by Bi ions. g is determined to be about 1.3 nm/min for our etching conditions and material. It should be noted that this g value can be varied substantially depending upon the LPCVD parameters for SiN deposition as well as $H_3PO_4$ aging and etching cell geometry.

Consider now some examples of different pore shapes. First, consider conical shapes obtained according to the route a in FIG. 2. The access of the etchant is hindered from one side of the membrane. The example in FIGS. 5A and 5B are cross-sectional scanning electron microphotographs of membranes 10 containing conical pores 18 prepared by etching SiN films in $H_3PO_4$, for 40 and 50 minutes respectively.

Consider now how double conical shapes can be obtained as shown in FIG. 2C. The etchant can access the membrane surface freely from both sides. The example of FIGS. 6A and 6B are cross-sectional scanning electron microphotographs of membranes prepared by etching irradiated SiN films in $H_3PO_4$, for 30 and 40 minutes respectively.

Different applications dictate various desired membrane parameters; our technique allows for a very easy match for almost any membrane application. For example, the density of the ion irradiation controls the membrane porosity i.e. the numbers of pores 18. In FIGS. 7A and 7B the membranes 10 were obtained by etching of silicon nitride films exposed to $10^8$ and $10^9$ ions per $cm^2$ respectively.

Our membranes 10 have many advantages over the current "state of the art" membranes that are currently used in commercial filtration/separation procedures. We have performed experiments showing filtration capability of the SiN membranes based on (i) the charge and (ii) the size of the analyte molecules as shown diagrammatically in FIG. 8. The separations can be performed from high ionic strengths of the background solution, comparable to physiological conditions. The membranes have a range of thicknesses between less than 10 nm up to micrometer scale. Tuning the membrane thickness, thus pore length, is important in optimization of separation processes. Thin membranes offer higher fluxes compared to the fluxes obtained in conventional polymer membranes prepared by the latent track etching technique. Also the inorganic material from which our membranes are made can withstand very harsh conditions. Thus such membranes 10 can be used for filtration at high temperatures and/or very corrosive solutions. In addition, the membrane's surface can be cleaned, renewed/regenerated multiple times by corrosive solutions. i.e. piranha solution. In fact, even clogged membranes 10 can be reclaimed by subjecting them to harsh chemical conditions.

Figure 10A:
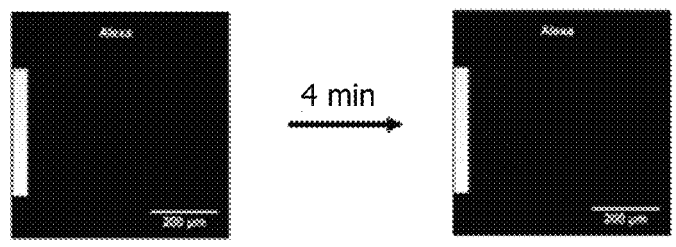
FIGS. 10A-10D illustrate the use of the embodiments of the invention to observe simultaneous filtration of two different low molecular weight fluorophores through the membrane.
Figure 10B:
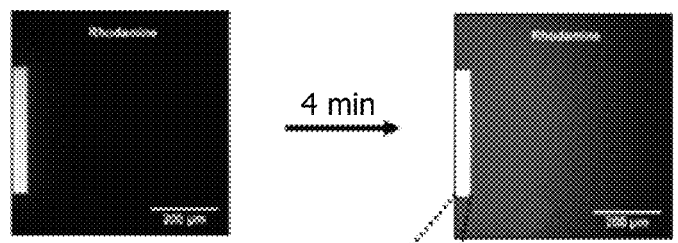

Consider experimental examples of filtration/separation. First, filtration by charge. As a proof of principle we have performed filtration experiments with two fluorescent dyes which possess different charges as shown in FIGS. 10A-10D: Rhodamine 123 (MW—400, charge: +1) and Alexa Fluor 568 (MW—800, charge: −3). FIG. 10A on the left is a fluorescent image of Alexa 568 passage through a negatively charged membrane taken immediately after introduction of the feeding solution on the top of the membrane. The left image of FIG. 10A was acquired 4 minutes later. The two images are nearly identical and dark showing nearly perfect rejection of the negatively charged dye. FIG. 10B on the left illustrates the passage of Rhodamine dye, which is positively charged. It diffuses freely through the membrane thus forming a bright final image on the right 4 minutes later.

Figure 10C:
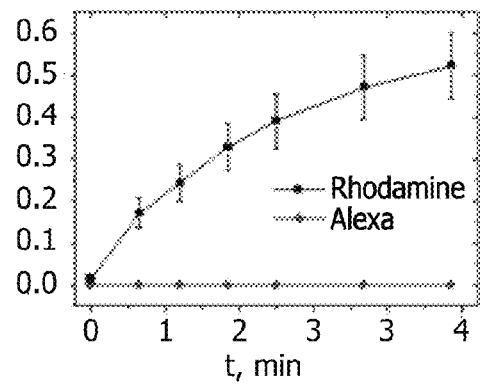
Figure 10D:
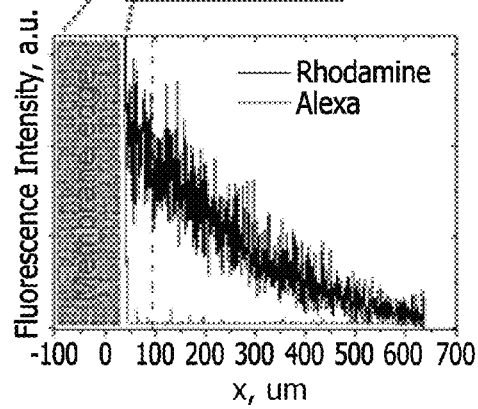

FIG. 10C is a graph of the kinetic of passage of the Alexa and Rhodamine dyes. The fluorescence intensity was measured from the level at a position 50 μm away from the membrane edge shown by the dashed line in FIG. 10D. The fluorescence intensity was normalized to the intensity in the first frame measured in the middle of the membrane. FIG. 10D is a graph of the cross section of the final frame taken after 4 minutes as shown in FIGS. 10A and 10B, showing the fluorescence intensity of Alexa as very low compared to that for Rhodamine.

Figure 9:
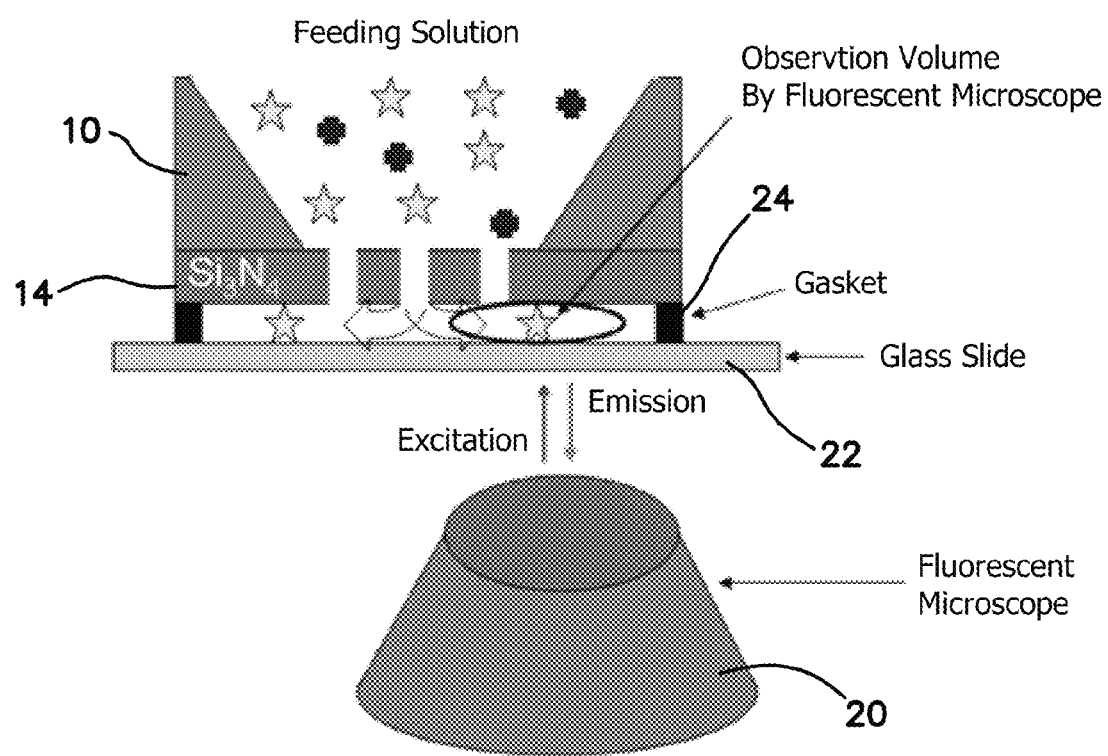
FIG. 9 is a diagram illustrating an experimental setup wherein an embodiment of the invention is actually reduced to practice by monitoring the filtration/separation processes using fluorescent microscopy. A membrane chip is placed on a supporting gasket mounted on a microscope slide. A small volume, e.g. less than 5 µL of a feed solution containing a species to be separated is introduced on the top of the membrane chip. A confocal fluorescent microscope is used to image the passage of fluorophores through the membrane.

Since our pores 18 have an intrinsic negative surface charge, the negative dye (Alexa Fluor) is excluded from the pores by electrostatic forces, so that only the positive dye (Rhodamine) is allowed to pass through the membrane 10. Monitoring the fluorophors passage through the membrane using a fluorescent microscope 20 was done according to the previously published material; the experimental setup from which the data of FIG. 10 was derived is shown in FIG. 9. Supported membrane 10 was mounted on a gasket 24 on a glass side 22 and the output side of membrane 10 was observed with fluorescent microscope 20 showing passage of only the positive dye (Rhodamine). The example membranes with thicknesses between 100 nm and 200 nm assured high fluxes and excellent selectivity at high ionic concentrations of the background electrolyte, up to 1.0 M.

Figure 11:
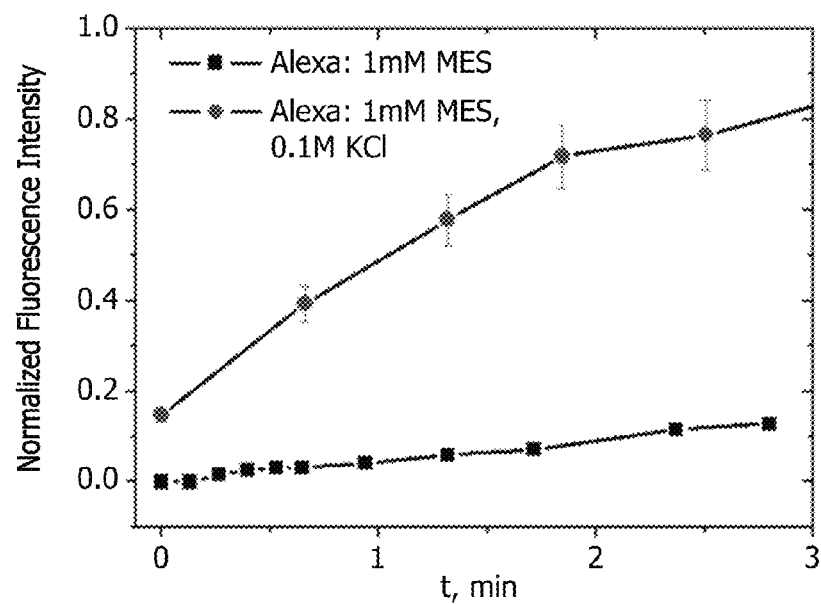
FIG. 11 is a graph of normalized fluorescence intensity vs time showing the influence of ionic strength on the electrostatically based separation and rejection of the Alexa dye.

Second, consider filtration by size. We have shown different permeation rates through our fabricated nano-sieve membranes 10 for proteins which have similar molecular weights. As an example, we have used BSA (MW— 67 KDa, labeled with Alexa Fluor 488) and IgG (MW—150 KDa, labeled with Alexa Fluor 680). In order to reduce the electrostatic effect of the surface charge, the experiments were performed at high ionic strength conditions such as 0.5M KCl. FIG. 11 is a graph of normalized fluorescence intensity vs time showing the influence of ionic strength on the electrostatically based separation and rejection of the Alexa dye. Evidence of the electrostatic nature of the separation process is shown in the set up of FIG. 9 by increasing ionic strength of the solution for Alexa. At a high ionic strength the negative surface charges of the pore walls are screened by the electrolyte thus increasing the passage of the negative dye. The square data points show the passage of Alexa though the negatively charged membrane at a low ionic strength solution (1 mM MES buffer). The electrostatic rejection is very effective so that Alexa flux is very low. The circular data points show the passage of Alexa though the negatively charged membrane at a high ionic strength solution of 100 mM KCl in 1 mM MES buffer. The electrostatic rejection is less effective compared to the low ionic strength solution and the Alexa flux is significantly higher. Appreciable selectivity of the pores of the illustrated embodiment based on charge separation have been realized even for very high ionic strengths, e.g. 1M KCl, which demonstrates the nanometer opening of the pores.

Figure 12:
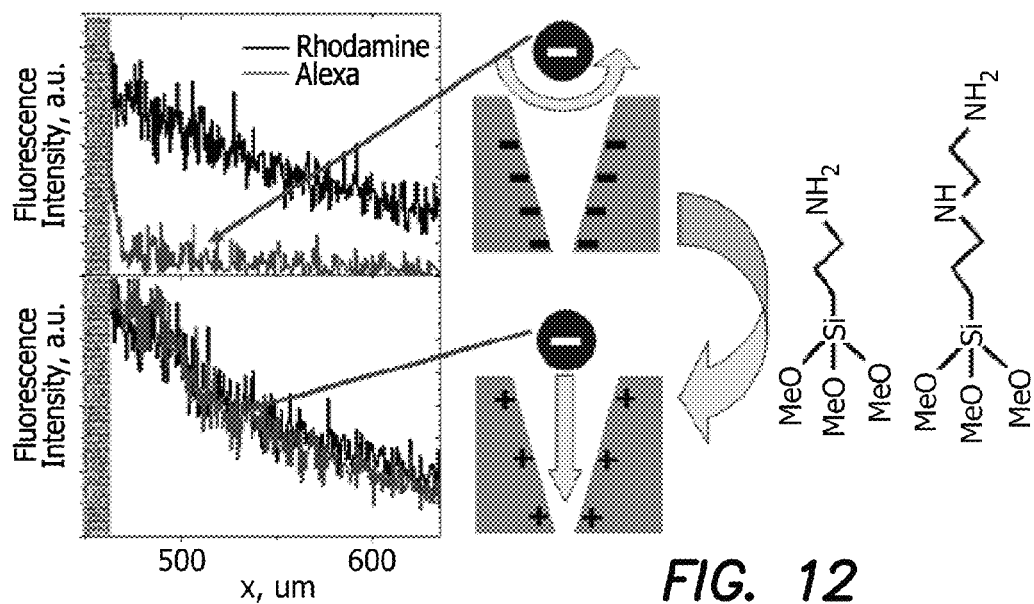
FIG. 12 illustrates the influence of membrane surface chemistry on the transport and separation properties of the filters.

FIG. 12 illustrates the influence of membrane surface chemistry on the transport and separation properties of the filters. As a result of the fabrication process of irradiation and etching the membrane pores and pore walls are covered with silanol groups similar to the silica surface. Those Si—OH groups are deprotonated at pH>2, rendering the membrane surface negatively charged as evidenced by the discussion above in connection with FIGS. 10A-10D. Silanol groups can be modified by silanes as shown in FIG. 12 to introduce desired functionalities to the membrane as well as to provide a platform for immobilization of different chemical and bioactive species, i.e. enzymes, DNA, proteins and the like. As a proof of concept we modified our prepared membranes with amine containing silanes, which rendered the membrane surface positively charged at pH<9. Note that the silanization procedure used here serves only as example. Many other chemical modifications of the membrane surface are possible and readily available in the art. After the modification with silanes (either (3-Aminopropyl) trimethoxysilane or [3-(2-Aminoethylamine)propyl] trimethoxysilane), the flux of negative species (Alexa 568) is dramatically increased due to the positive surface charge of the membrane induced by amines coupled to the surface. This is shown by a comparison of the traces in FIG. 12. The decrease of the positive dye's (rhodamine) flux should be observed as well, however, since our negative probe has charge −3, while the positive dye is only a +1, Alexa is more sensitive to the change in membrane surface charge. This is exactly what was observed experimentally. Fluorescence images and profiles shown in FIG. 12 were taken 2 minutes after introducing the dyes in 1 mM MES solution on top of the membrane in the setup of FIG. 9.

FIGS. 13A-13E illustrate the simultaneous separation of BSA and IgG proteins. FIGS. 13A-13C are fluorescent images taken 4 minutes after introduction of a feed solution. Flourescence due to permeation is shown in FIG. 13A for Alexa dye, in FIG. 13B for BSA and in FIG. 13C for IgG. FIGS. 13D and 13E are graphs which illustrate the passage kinetics of different species in FIG. 13D and in FIG. 13E the fluorescence intensity at the cross-section in the middle of the images shown in FIG. 13C. Even though BSA and IgG have diffusion coefficients that differ by no more than 40%, fluxes of these proteins through the membranes are different by a factor of more than 3. This separation can be improved by adjusting the etching time, and thus adjusting the pore radii.

Figure 14A:
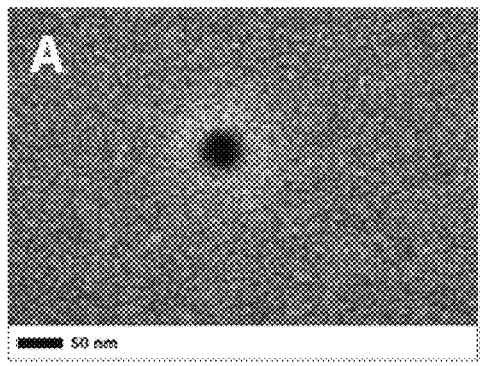
FIGS. 14A-14D illustrate the large opening of conical pores formed in SiN membranes by Xe irradiation and subsequent etching in 150° C. $H_3PO_4$.
Figure 14B:
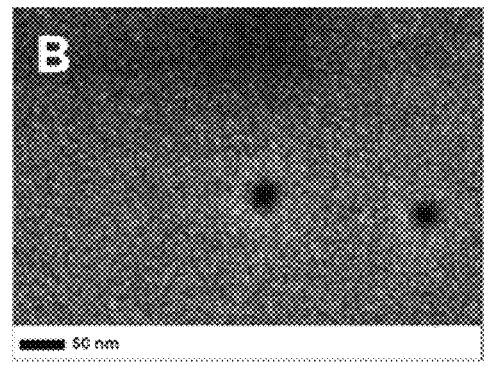
Figure 14C:
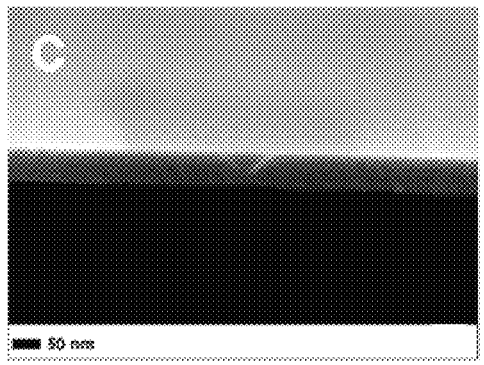
Figure 14D:
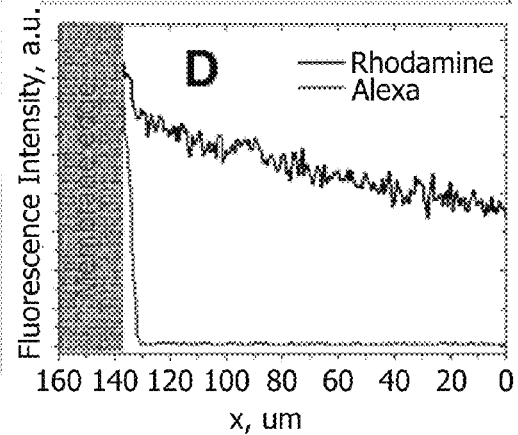

Turn now to the irradiation by lighter ions, Xe. It is well-known that lighter ions produce less damage to the irradiated material. In order to test the effect of lighter ions on the pore formation, we have irradiated our SiN membranes 10 with xenon ions. FIGS. 14A-14D illustrate the large opening of conical pores formed in SiN membranes by Xe irradiation and subsequent etching in 150° C. $H_3PO_4$. Scanning electron microscopy images of pores are shown as obtained after 50 minutes of irradiation in FIG. 14A and 30 minutes in FIG. 14B. FIG. 14C is a scanning electron microscopy image of the cross section of a SiN membrane. FIG. 14E is a graph of the permeation properties of the SiN membrane shown in FIG. 14C. Ion selectivity of the membrane is similar to the properties of membranes obtained by Bi irradiation, i.e. due to the intrinsic negative surface charge, the negative dye is very efficiently blocked by the membrane, while the positive dye permeates freely through the Xe irradiated membrane. The fluorescence traces that are shown were recorded 5 minutes after introduction of the dye solution on top of the membrane in the setup of FIG. 9.

Figure 4A:
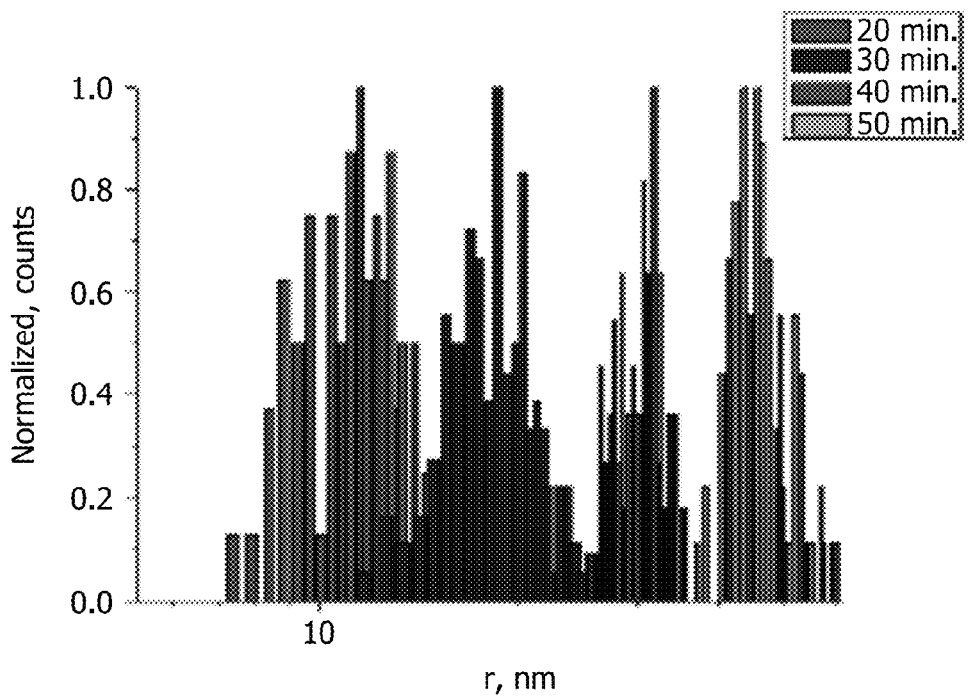
FIG. 4A is a bar graph of the pore radius distribution in membranes fabricated according to the illustrated embodiments of the invention as a function of the etching times of 20, 30, 40 and 50 minutes in a 150° C. $H_3PO_4$ solution.
Figure 4B:
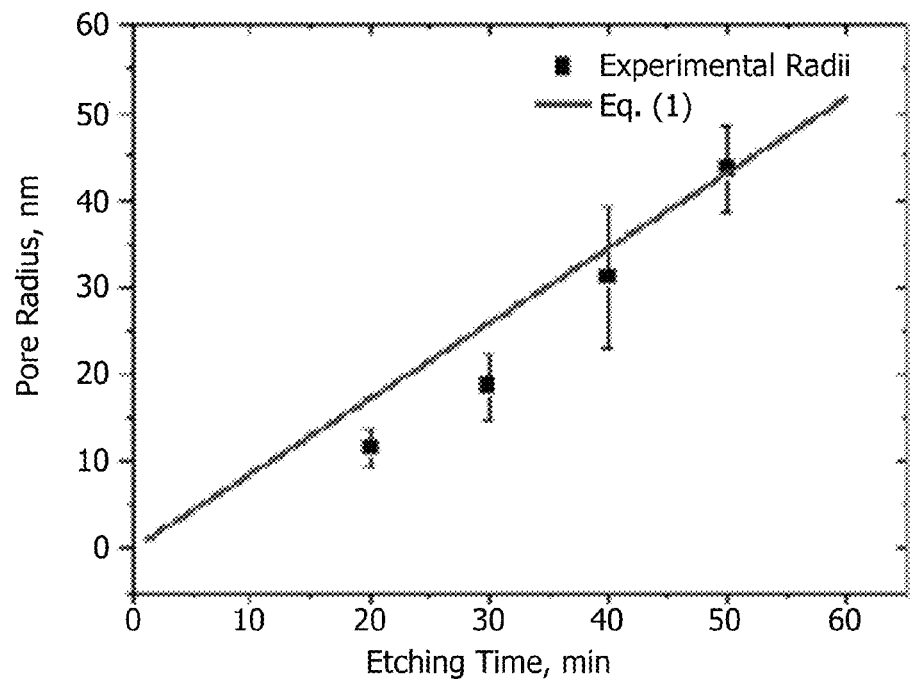
FIG. 4B is a graph of the experimentally observed pore radius vs etching time as compared against a theoretical model for the same giving in equation (1) below.

Even though the pores formation was clearly observed by SEM, and the permeation data were similar to these obtained with the Bi irradiated membranes 10, some dramatic differences between the membranes 10 prepared by Bi and Xe irradiation should be pointed out. First, the pore radius is much smaller after Xe irradiation compared to the Bi irradiation. Both membranes 10 were etched in the same conditions of 150° C. $H_3PO_4$. For example, after 50 min of etching, the radius of the base side is ~50 nm for Bi ions a shown in FIG. 4A, while for the Xe irradiated foils it is less than 15 nm as shown in FIGS. 14A-14D. This fact suggests that the etching along the track is much slower for the Xe irradiation than for Bi.

Second, in order to fully open the pores 18, as a consequence from the slower track etching, longer etching times were required for the Xe irradiated samples. Thus Xe irradiated membranes 10 containing fully open pores 18 have lower thickness. For example, to prepare a membrane 10 with open pores 18 using 300 nm thick films of a silicon nitride film as a starting point, the etching has to be continued until the thickness reaches about 60 nm or less for Xe irradiated samples. In case of Bi irradiated samples, foils with much larger thicknesses of ~120 nm contained open pores 18.

Third, low etching rate along the track can be clearly seen on the SEM cross-section images. For example, open pore angle for Bi irradiated samples is ~23° in FIGS. 5A and 5B, however for a Xe irradiation, the angle is ~50°. Thus, g/v ratio is much higher for Xe irradiated membranes and equals to 0.77 compared to 0.39 for Bi ions.

Fourth, for Xe with an energy of 160 MeV the energy loss was 22 MeV/μm. For Bi with an energy of 710 MeV the energy loss was 36 MeV/μm. The difference is due to the difference in atomic number, not due to the difference in energy.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for manufacturing a desalination membrane, the method comprising:
   obtaining a film;
   forming a plurality of conically-shaped nanopores in the film, the conically-shaped nanopores comprising internal surfaces;
   chemically modifying the internal surfaces of the nanopores with amine-containing groups by silanization;
   wherein at least a portion of the internal surfaces of the nanopores comprise amine-containing groups;
   wherein the amine-containing groups are positively charged at pH<9;
   wherein the membrane resists the passage of ions based on electrostatic interactions with the conical nanopores.

2. The method of claim 1, wherein the internal surfaces of the nanopores are chemically modified with the amine-containing groups.

3. The method of claim 1, wherein the internal surfaces of the nanopores comprise negatively charged species, wherein at least a portion of the negatively charged species are chemically modified to provide the amine-containing groups.

4. The method of claim 1, further comprising chemically etching the film to provide the conically-shaped nanopores.

5. The method of claim 1, further comprising patterning the film to selectively expose at least a portion of the film to radiation.

6. The method of claim 1, further comprising irradiating the film with energetic ions to form a plurality of tracks of material damage.

7. The method of claim 6, wherein the energetic ions have an atomic number of 8 or greater.

8. The method of claim 6, wherein the energetic ions have an atomic number of 18 or greater.

9. The method of claim 5, wherein the patterning of the film is performed using lithography.

10. The method of claim 1, wherein the film is an amorphous inorganic material.

11. The method of claim 1, wherein a nanopore density of the film is between $10^8$ pores per $cm^2$ and $10^9$ pores per $cm^2$.

12. The method of claim 1, wherein the membrane rejects the passage of molecules based on size.

13. The method of claim 4, wherein chemically etching of the film is performed using $H_3PO_4$ or HF.

* * * * *